(12) United States Patent
Kim et al.

(10) Patent No.: US 8,785,538 B2
(45) Date of Patent: Jul. 22, 2014

(54) ELECTROMAGNETIC WAVE SHIELDING THERMOPLASTIC RESIN COMPOSITION AND PLASTIC ARTICLE INCLUDING THE SAME

(75) Inventors: Sang Wan Kim, Uiwang-si (KR); Young Sil Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 412 days.

(21) Appl. No.: 12/488,656

(22) Filed: Jun. 22, 2009

(65) Prior Publication Data

US 2009/0298990 A1 Dec. 3, 2009

Related U.S. Application Data

(63) Continuation-in-part of application No. PCT/KR2006/005852, filed on Dec. 28, 2006.

(30) Foreign Application Priority Data

Dec. 22, 2006 (KR) .................. 10-2006-0132583

(51) Int. Cl.
*C08K 3/08* (2006.01)
*C08K 3/04* (2006.01)
*C08L 69/00* (2006.01)

(52) U.S. Cl.
USPC ............ 524/440; 524/439; 524/495; 524/496

(58) Field of Classification Search
USPC .................................. 524/439, 440, 495, 496
See application file for complete search history.

(56) References Cited

U.S. PATENT DOCUMENTS

| | | | |
|---|---|---|---|
| 4,460,752 A * | 7/1984 | Neuray et al. ................. | 525/462 |
| 4,569,786 A * | 2/1986 | Deguchi ......................... | 252/503 |
| 5,112,913 A * | 5/1992 | Horiuchi et al. .............. | 525/133 |
| 6,399,737 B1 * | 6/2002 | Elkovitch ...................... | 528/196 |
| 6,599,446 B1 | 7/2003 | Todt et al. | |
| 6,734,262 B2 * | 5/2004 | Patel .............................. | 525/419 |
| 6,762,237 B2 | 7/2004 | Glatkowski et al. | |
| 6,861,156 B2 * | 3/2005 | Palm ............................. | 428/594 |
| 7,105,596 B2 | 9/2006 | Smalley et al. | |
| 7,309,727 B2 | 12/2007 | Elkovitch et al. | |
| 7,514,021 B2 | 4/2009 | Miyagawa et al. | |
| 7,588,700 B2 | 9/2009 | Kwon et al. | |
| 2005/0119441 A1 * | 6/2005 | Ikeda et al. ................... | 528/196 |
| 2005/0272856 A1 | 12/2005 | Cooper et al. | |
| 2006/0089434 A1 * | 4/2006 | Nodera ......................... | 524/115 |

FOREIGN PATENT DOCUMENTS

| | | | |
|---|---|---|---|
| JP | 2002290094 A | * | 10/2002 |
| JP | 2004-134515 A | | 4/2004 |
| TW | 554349 B | | 9/2003 |
| TW | 200407914 A | | 5/2004 |
| WO | 2005/034144 A1 | | 4/2005 |
| WO | 2005/038824 A1 | | 4/2005 |
| WO | 2008/078847 A1 | | 7/2008 |

OTHER PUBLICATIONS

Machine translation of JP 2002-290094 (Oct. 4, 2002).*
International Search Report in counterpart International Application No. PCT/KR2006/005852, mailed Sep. 21, 2007.

* cited by examiner

*Primary Examiner* — Vickey Nerangis
(74) *Attorney, Agent, or Firm* — Additon, Higgins, Pendleton & Ashe, P.A.

(57) ABSTRACT

Disclosed herein are an electromagnetic wave shielding thermoplastic resin composition and a plastic article including the same. The electromagnetic wave shielding thermoplastic resin composition comprises about 100 parts by weight of a thermoplastic resin comprising a polycarbonate resin, a polyester resin, or a combination thereof, about 1 to about 30 parts by weight of stainless steel fiber, and about 0.01 to about 10 parts by weight of carbon nanotubes.

11 Claims, No Drawings

ELECTROMAGNETIC WAVE SHIELDING THERMOPLASTIC RESIN COMPOSITION AND PLASTIC ARTICLE INCLUDING THE SAME

CROSS-REFERENCE TO RELATED APPLICATIONS

This non-provisional application is a continuation-in-part application of PCT Application No. PCT/KR2006/005852, filed Dec. 28, 2006, pending, which designates the U.S. and which is hereby incorporated by reference in its entirety, and claims priority therefrom under 35 USC Section 120. This application also claims priority under 35 USC Section 119 from Korean Patent Application No. 10-2006-0132583, filed Dec. 22, 2006, the entire disclosure of which is also hereby incorporated by reference.

FIELD OF THE INVENTION

The present invention relates to an electrically conductive thermoplastic resin composition and a plastic article including the same.

BACKGROUND OF THE INVENTION

Thermoplastic resins are plastics which are softened and plasticized by heating and are hardened by cooling. Thermoplastic resins are divided into: common plastics such as polyethylene, polypropylene, acrylic, styrene, and vinyl resins; and engineering plastics such as polycarbonate, polyphenylene ether, polyamide, polyester, and polyimide resins.

Thermoplastic resins are widely utilized numerous in applications, including various household supplies, office automation equipment, and electric and electrical appliances, owing to their superior processability and formability. There has been a continuous attempt to use a thermoplastic resin as a high value-added material by imparting specific properties as well as superior processability and formability to the thermoplastic resin, according to the kind and properties of the products in which the thermoplastic resin is used. In particular, there have been various attempts to impart electromagnetic wave shielding performance to a thermoplastic resin and utilize the electromagnetic wave shielding thermoplastic resin in the manufacture of automobiles, electric apparatuses, electronic assemblies, and electrical cables, among other products.

Electromagnetic wave shielding thermoplastic resin is conventionally prepared from an electromagnetic wave shielding thermoplastic resin composition obtained by mixing a thermoplastic resin with an additive, such as a metallic powder, a metal-coated inorganic powder, or a metallic fiber. To ensure a desired level of the electromagnetic wave shielding performance of the electromagnetic wave shielding thermoplastic resin, the additive, due to its high specific gravity, must be used in significantly large amounts. However, such a large amount of the additive used to improve electromagnetic wave shielding performance can cause deterioration in inherent characteristics (e.g., impact resistance) of the thermoplastic resin, thus making it impossible to practically use the electromagnetic wave shielding thermoplastic resin.

SUMMARY OF THE INVENTION

The present invention relates to an electromagnetic wave shielding thermoplastic resin composition with improved electromagnetic wave shielding performance and a plastic article produced from the resin composition.

In accordance with one aspect of the present invention, there is provided an electromagnetic wave shielding thermoplastic resin composition comprising: about 100 parts by weight of a thermoplastic resin comprising a polycarbonate resin, a polyester resin, or a combination thereof; about 1 to about 30 parts by weight of stainless steel fiber; and about 0.01 to about 10 parts by weight of carbon nanotubes.

The thermoplastic resin may include an aromatic polycarbonate resin, which can be prepared by reacting phosgene, halogen formate, or diester carbonate with a diphenol compound represented by Formula 1 below:

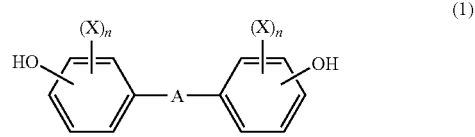

(1)

wherein A represents a single bond, $C_1$-$C_5$ alkylene, $C_1$-$C_5$ alkylidene, $C_5$-$C_6$ cycloalkylidene, —S— or —$SO_2$—; X is halogen; and n is 0, 1 or 2.

The polycarbonate resin may have a weight average molecular weight of about 15,000 to about 50,000 g/mol.

In the electromagnetic wave shielding thermoplastic resin composition, the stainless steel fiber may include ferritic stainless steel fibers, austenitic stainless steel fibers, or a combination thereof.

The stainless steel fiber may have a thickness (diameter) of about 4 to about 25 μM and a length of about 3 to about 15 mm.

In the electromagnetic wave shielding thermoplastic resin composition, the carbon nanotubes may be single-walled carbon nanotubes, double-walled nanotubes, multi-walled carbon nanotubes, or a combination thereof.

The carbon nanotubes may have a thickness (diameter) of about 1 to about 50 nm and a length of about 1 to about 25 μm.

In accordance with another aspect of the present invention, there is provided a plastic article produced from the electromagnetic wave shielding thermoplastic resin composition.

In accordance with yet another aspect of the present invention, there is provided a plastic article comprising: a thermoplastic resin matrix comprising a polycarbonate resin, a polyester resin, or a combination thereof; and stainless steel fiber and carbon nanotubes dispersed in the thermoplastic resin matrix.

Details of other aspects and exemplary embodiments of the present invention are encompassed in the following detailed description.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

According to one embodiment of the present invention, there is provided an electromagnetic wave shielding thermoplastic resin composition comprising: about 100 parts by weight of a thermoplastic resin comprising a polycarbonate resin, a polyester resin, or a combination thereof; about 1 to about 30 parts by weight of stainless steel fiber; and about 0.01 to about 10 parts by weight of carbon nanotubes.

As described above, the electromagnetic wave shielding thermoplastic resin composition comprises the stainless steel fiber and carbon nanotubes as well as the thermoplastic resin comprising a polycarbonate resin, a polyester resin, or a combination thereof. The stainless steel fiber interacts with the carbon nanotubes, creating a synergistic effect. As a result, even a relatively small amount of these constituent components can impart considerably improved electromagnetic wave shielding performance to the electromagnetic wave shielding thermoplastic resin. In addition, reducing the amount of these components (stainless steel fiber and carbon nanotubes) can decrease deterioration of the inherent characteristics (e.g., impact resistance) of the electromagnetic wave shielding thermoplastic resin.

Hereinafter, each constituent component of the electromagnetic wave shielding thermoplastic resin composition will be described in detail.

The electromagnetic wave shielding thermoplastic resin composition comprises a thermoplastic resin selected from a polycarbonate resin, a polyester resin, or a combination thereof.

Examples of the thermoplastic resin include an aromatic polycarbonate resin, which can be prepared by reacting phosgene, halogen formate, or diester carbonate with a diphenol compound represented by Formula 1 below:

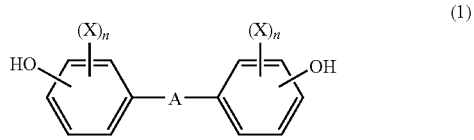

(1)

wherein A represents a single bond, $C_1$-$C_5$ alkylene, $C_1$-$C_5$ alkylidene, $C_5$-$C_6$ cycloalkylidene, —S—, or —$SO_2$—; X is halogen; and n is 0, 1 or 2.

Examples of the diphenol compound of Formula 1 include without limitation hydroquinone, resorcinol, 4,4'-dihydroxydiphenyl, 2,2-bis-(4-hydroxyphenyl)-propane (also referred to as "bisphenol-A" or "BPA"), 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane, and the like, and combinations thereof.

The polycarbonate resin can have a weight average molecular weight of about 15,000 to about 50,000 g/mol.

There is no limitation as to the type of the polycarbonate resin. For example, the polycarbonate resin may be a linear or branched polycarbonate resin, or a polyester-carbonate copolymer resin, or a combination thereof. The branched polycarbonate resin may be prepared by using about 0.05 to about 2 mol % of a tri- or higher functional (i.e., polyfunctional) compound, e.g., a tri- or higher functional phenol compound, based on the total moles of the diphenol compound. The polyester-carbonate copolymer resin may be prepared by polymerizing polycarbonate in the presence of an ester precursor, such as dicarboxylic acid.

The polycarbonate resin may be a homopolycarbonate, a copolycarbonate resin, or a combination thereof.

Alternatively, the polyester resin may be used as the thermoplastic resin.

The polyester resin may contain an ester linkage in a polymer chain and be melted by heating. The polyester resin can be obtained by polycondensation of dicarboxylic acid and a dihydroxy compound. There is no limitation as to the preparation method of the polyester resin. Accordingly, any polyester resin prepared by employing any method well-known to those skilled in the art may be used. In addition, any polyester resin, such as a homopolyester or copolyester resin, or a combination thereof, may be used without any particular limitation.

The electromagnetic wave shielding thermoplastic resin composition comprises stainless steel fiber. The stainless steel fiber interacts with the carbon nanotubes, creating a synergistic effect. As a result, the electromagnetic wave shielding thermoplastic resin can have improved electromagnetic wave shielding performance.

The stainless steel fiber is an alloy fiber using iron (Fe) as a base metal and using a significant amount of chrome (Cr) or nickel (Ni) as a main material. Stainless steel fibers are produced by drawing a bundle of continuous filament fibers from stainless steel through dies. Although stainless steel fiber contains iron (Fe) as a main component, it has ferromagneticity at ambient temperature as well as superior corrosion resistance and heat resistance unobtainable from conventional steel, thereby imparting improved electromagnetic wave shielding performance to the electromagnetic wave shielding thermoplastic resin.

The stainless steel fiber in the electromagnetic wave shielding thermoplastic resin composition can be a ferritic or austenitic stainless steel fiber, taking into consideration electromagnetic wave shielding performance of the electromagnetic wave shielding thermoplastic resin.

The stainless steel fibers can have a thickness of about 4 to about 25 μM and a length of about 3 to about 15 mm. Accordingly, the stainless steel fibers are uniformly dispersed in the electromagnetic wave shielding thermoplastic resin, thereby ensuring uniformity in electromagnetic wave shielding performance of the electromagnetic wave shielding thermoplastic resin.

The electromagnetic wave shielding thermoplastic resin composition includes stainless steel fiber in an amount of about 1 to about 30 parts by weight, for example about 5 to about 25 parts by weight, based on about 100 parts by weight of a thermoplastic resin comprising a polycarbonate resin, a polyester resin, or a combination thereof. An amount of stainless steel fiber less than about 1 part by weight may make it difficult to ensure sufficient electromagnetic wave shielding performance of the electromagnetic wave shielding thermoplastic resin prepared from the resin composition. Meanwhile, an amount of stainless steel fiber exceeding about 30 parts by weight may deteriorate inherent characteristics (e.g., impact resistance) of the electromagnetic wave shielding thermoplastic resin.

The electromagnetic wave shielding thermoplastic resin composition further comprises the carbon nanotubes. The carbon nanotubes interact with the stainless steel fiber, creating a synergistic effect. As a result, the electromagnetic wave shielding thermoplastic resin can have improved electromagnetic wave shielding performance.

The carbon nanotubes exhibit superior mechanical strength, high initial Young's modulus, and a large aspect ratio. In addition, carbon nanotubes have superior electrical conductivity and thermal stability. Based on these characteristics, the mixing of carbon nanotubes with the thermoplastic resin imparts superior electromagnetic wave shielding performance to the thermoplastic resin.

Carbon nanotubes can be synthesized by arc-discharge, pyrolysis, laser ablation, plasma enhanced chemical vapor deposition (PECVD), thermal chemical vapor deposition, electrolysis, or flame synthesis. However, there is no limitation as to the synthesis method of the carbon nanotubes. Accordingly, carbon nanotubes synthesized by employing any method may be used for the electromagnetic wave shielding thermoplastic resin composition without any particular limitation.

Carbon nanotubes are divided into single-walled carbon nanotubes, double-walled carbon nanotubes and multi-walled carbon nanotubes, based on the wall number constituting thereof. Any carbon nanotubes may be utilized in the electromagnetic wave shielding thermoplastic resin composition without any particular limitation.

Carbon nanotubes can have a thickness (diameter) of about 1 to about 50 nm, and a length of about 1 to about 25 μm. Accordingly, the carbon nanotubes can be uniformly dispersed in the electromagnetic wave shielding thermoplastic resin, thereby ensuring uniformity in electromagnetic wave shielding performance of the electromagnetic wave shielding thermoplastic resin.

The electromagnetic wave shielding thermoplastic resin composition includes the carbon nanotubes in an amount of about 0.01 to about 10 parts by weight, for example about 0.5 to about 5 parts by weight, based on about 100 parts by weight of a thermoplastic resin comprising a polycarbonate resin, a polyester resin, or a combination thereof. An amount of carbon nanotubes less than about 0.01 parts by weight can make it impossible to ensure sufficient electromagnetic wave shielding performance of the electromagnetic wave shielding thermoplastic resin prepared from the resin composition. Meanwhile, an amount of carbon nanotubes exceeding about 10 parts by weight can deteriorate mechanical properties of the thermoplastic resin.

The electromagnetic wave shielding thermoplastic resin composition may further comprise an additive suitable for the intended use, in addition to the aforementioned constituent components. Examples of additives include without limitation lubricants, release agents, stabilizers, inorganic additives, pigments, dyes, and combinations thereof. The additive can be used in an amount of not more than about 5 parts by weight, for example about 0.1 to about 2 parts by weight, based on about 100 parts by weight of the thermoplastic resin.

The electromagnetic wave shielding thermoplastic resin can be prepared by conventional methods such as: mixing each constituent component to prepare an electromagnetic wave shielding thermoplastic resin composition; and melt-extruding the resin composition in an extruder. The electromagnetic wave shielding thermoplastic resin composition can also be injection molded using methods known in the art. A plastic article is produced from the electromagnetic wave shielding thermoplastic resin.

According to another embodiment of the present invention, there is provided a plastic article produced from the electromagnetic wave shielding thermoplastic resin composition. More specifically, the plastic article may comprise a thermoplastic resin matrix comprising a polycarbonate resin, a polyester resin, or a combination thereof, and stainless steel fiber and carbon nanotubes dispersed in the thermoplastic resin matrix.

The plastic article exhibits more enhanced electromagnetic wave shielding performance owing to the synergistic effect between the carbon nanotubes and the stainless steel fiber, both of which are dispersed in the thermoplastic resin matrix, despite the relative small amount used of these components. The use of the stainless steel fiber and the carbon nanotubes in a small amount can reduce the deterioration of mechanical properties (e.g., impact resistance) of the thermoplastic resin.

The plastic article can exhibit superior electromagnetic wave shielding performance, e.g., about 60 to about 90 dB. In addition, the notched IZOD impact strength (⅛") of the plastic article measured in accordance with ASTM D256 can range from about 5 to about 30 kgf·cm/cm. This indicates that the plastic article has superior impact resistance.

According to yet another embodiment of the present invention, there is provided a plastic article comprising: a thermoplastic resin matrix comprising a polycarbonate resin, a polyester resin, or a combination thereof; and stainless steel fiber and carbon nanotubes dispersed in the thermoplastic resin matrix, wherein the plastic article has an electromagnetic wave shielding performance of about 60 to about 90 dB, and a notched IZOD impact strength (⅛") of about 5 to about 30 kgf·cm/cm measured in accordance with ASTM D256.

Based on superior impact resistance as well as improved electromagnetic wave shielding performance, the plastic article can be widely utilized in a variety of applications, e.g., impartment of electromagnetic wave shielding performance to automobiles, electric apparatuses, electronic assemblies, and electrical cables, among other products.

Now, the present invention will be described in more detail with reference to the following Examples, such that those skilled in the art easily practice the present invention. These examples are provided only for illustrating the present invention and should not be construed as limiting the scope and spirit of the present invention.

The further details for (A) a polycarbonate resin, (B) stainless steel fiber, and (C) carbon nanotubes used in the following examples and comparative examples are as follows:

(A) Polycarbonate Resin

Bisphenol-A polycarbonate having a weight average molecular weight (Mw) of 25,000 g/mol is used as a polycarbonate resin.

(B) Stainless Steel Fiber

GR-75/C20® (available from Bekaert Fiber Technologies, Belgium, thickness: 11 μm, length: 6 mm) is used as a stainless steel fiber.

(C) Carbon Nanotubes

Multi-walled carbon nanotubes (C-tube 100® available from CNT Co., LTD., thickness: 10-50 nm, length: 1-25 μm) are used as carbon nanotubes.

Examples 1 to 2 and Comparative Examples 1 to 5

The content of each constituent component used in the following Examples and Comparative Examples is shown in Table 1. Respective components are mixed in accordance with the composition in Table 1 to prepare an electromagnetic wave shielding thermoplastic resin composition. The composition is extruded in a double-screw extruder (L/D=35, Φ=45 mm) and the resulting extrudate is pelletized. The pellets are injected in an injection machine (10 oz) at 300° C. to prepare a sample for measurement of physical properties and electromagnetic wave shielding performance.

The sample is left under a 50% relative humidity atmosphere for 24 hours at 23° C. Then, the electromagnetic wave shielding performance of the sample with a thickness of 3 mm is measured with a network analyzer (E5071C® available from Agilent Technologies Inc.) (evaluation for electromagnetic wave shielding performance).

The notched IZOD impact strength (⅛") of the sample is measured in accordance with ASTM D256, which is an American standard test method for determining an IZOD impact strength of plastics with a pendulum having a uniform weight (evaluation for impact resistance).

The measurement results of the electromagnetic wave shielding performance and impact resistance are shown in Table 1 below.

TABLE 1

|  | Ex. | | Comp. Ex. | | | | |
| --- | --- | --- | --- | --- | --- | --- | --- |
|  | 1 | 2 | 1 | 2 | 3 | 4 | 5 |
| (A) polycarbonate resin (wt. parts) | 100 | 100 | 100 | 100 | 100 | 100 | 100 |
| (B) stainless steel fiber (wt. parts) | 10 | 20 | — | 10 | 20 | — | 35 |
| (C) carbon nanotubes (wt. parts) | 2 | 1 | — | — | — | 5 | 15 |
| Electromagnetic wave shielding performance (dB) | 70 | 80 | 0 | 50 | 60 | 5 | 80 |
| IZOD impact strength (⅛") (kgf·cm/cm) | 20 | 15 | 60 | 25 | 20 | 20 | 2 |

As can be seen from the data in Table 1, Examples 1 and 2 comprising both stainless steel fiber and carbon nanotubes exhibit considerably improved electromagnetic wave shielding performance, as compared to Comparative Examples 2 to 4 comprising either stainless steel fiber or carbon nanotubes. In Examples 1 and 2, there is hardly any deterioration in impact resistance.

Examples 1 to 2 comprising both stainless steel fiber and carbon nanotubes also exhibit considerably improved electromagnetic wave shielding performance, as compared to Comparative Examples 1 comprising neither stainless steel fiber nor carbon nanotubes.

Examples 1 to 2, in which stainless steel fiber and carbon nanotubes are used in amounts in accordance with the present invention, hardly underwent any deterioration in impact resistance. On the other hand, Comparative Example 5, in which these two components are used in amounts outside the present invention, underwent rapid deterioration in impact resistance, thus being unsuitable for practical use.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. An electromagnetic wave shielding thermoplastic resin composition comprising:
   about 100 parts by weight of a thermoplastic resin comprising a polycarbonate resin, wherein the thermoplastic resin may optionally comprise a polyester resin;
   about 5 to about 25 parts by weight of stainless steel fiber; and
   1 to about 5 parts by weight of carbon nanotubes wherein an article prepared from the composition has an electromagnetic wave shielding performance of about 60 to about 90 dB, and a notched IZOD impact strength (⅛") of about 5 to about 30 kgf·cm/cm measured in accordance with ASTM D256.

2. The electromagnetic wave shielding thermoplastic resin composition according to claim 1, wherein the thermoplastic resin includes an aromatic polycarbonate resin.

3. The electromagnetic wave shielding thermoplastic resin composition according to claim 1, wherein the polycarbonate resin is prepared by reacting phosgene, halogen formate, or diester carbonate with a diphenol compound represented by Formula 1 below:

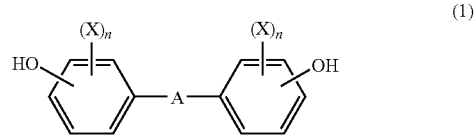

wherein A represents a single bond, C1-C5 alkylene, C1-C5 alkylidene, C5-C6 cycloalkylidene, —S— or —SO2—; X is halogen; and n is 0, 1 or 2.

4. The electromagnetic wave shielding thermoplastic resin composition according to claim 1, wherein the polycarbonate resin has a weight average molecular weight of about 15,000 to about 50,000 g/mol.

5. The electromagnetic wave shielding thermoplastic resin composition according to claim 1, wherein the stainless steel fiber is ferritic stainless steel fiber, austenitic stainless steel fiber, or a combination thereof.

6. The electromagnetic wave shielding thermoplastic resin composition according to claim 1, wherein the stainless steel fiber has a thickness of about 4 to about 25 μm and a length of about 3 to about 15 mm.

7. The electromagnetic wave shielding thermoplastic resin composition according to claim 1, wherein the carbon nanotubes are single-walled carbon nanotubes, double-walled nanotubes, multi-walled carbon nanotubes, or a combination thereof.

8. The electromagnetic wave shielding thermoplastic resin composition according to claim 1, wherein the carbon nanotubes have a thickness of about 1 to about 50 nm and a length of about 1 to about 25 μm.

9. A plastic article produced from the electromagnetic wave shielding thermoplastic resin composition according to claim 1.

10. The electromagnetic wave shielding thermoplastic resin composition according to claim 1, comprising 1 to 2 parts by weight of carbon nanotubes.

11. A plastic article comprising:
   about 100 parts by weight of a thermoplastic resin matrix comprising a polycarbonate resin, wherein the thermoplastic resin may optionally comprise a polyester resin; and
   about 5 to about 25 parts by weight of stainless steel fiber and about 1 to about 5 parts by weight of carbon nanotubes, each being dispersed in the thermoplastic resin matrix,
   wherein the plastic article has an electromagnetic wave shielding performance of about 60 to about 90 dB, and a notched IZOD impact strength (⅛") of about 5 to about 30 kgf·cm/cm measured in accordance with ASTM D256.

* * * * *